(12) United States Patent
Van De Sluis et al.

(10) Patent No.: US 11,036,894 B2
(45) Date of Patent: Jun. 15, 2021

(54) COMPUTER IMPLEMENTED GENERATION OF A VIRTUAL DESIGN OF A LIGHTING DEVICE

(71) Applicant: SIGNIFY HOLDING B.V., Eindhoven (NL)

(72) Inventors: Bartel Marinus Van De Sluis, Eindhoven (NL); Bram Knaapen, Eindhoven (NL); Tim Dekker, Eindhoven (NL); Anthonie Hendrik Bergman, Nuenen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 330 days.

(21) Appl. No.: 15/757,387

(22) PCT Filed: Aug. 23, 2016

(86) PCT No.: PCT/EP2016/069893
§ 371 (c)(1),
(2) Date: Mar. 5, 2018

(87) PCT Pub. No.: WO2017/042027
PCT Pub. Date: Mar. 16, 2017

(65) Prior Publication Data
US 2018/0253507 A1    Sep. 6, 2018

(30) Foreign Application Priority Data

Sep. 11, 2015   (EP) ..................................... 15184768

(51) Int. Cl.
*G06F 30/00*     (2020.01)
*H05B 45/00*    (2020.01)
(Continued)

(52) U.S. Cl.
CPC ............. *G06F 30/00* (2020.01); *H05B 45/00* (2020.01); *H05B 47/155* (2020.01); *G06F 2111/02* (2020.01)

(58) Field of Classification Search
CPC ...... F21S 2/00; F21V 23/0464; G02B 6/0078; G02B 27/0012; G03F 7/70441;
(Continued)

(56) References Cited

U.S. PATENT DOCUMENTS

| 5,255,206 A | 10/1993 | Pegis | |
| 2005/0168498 A1* | 8/2005 | Granik | G03F 7/70441 345/698 |

(Continued)

FOREIGN PATENT DOCUMENTS

| WO | 2013186684 A2 | 12/2013 |
| WO | 2014013377 A2 | 1/2014 |

(Continued)

*Primary Examiner* — Kandasamy Thangavelu

(57) ABSTRACT

The invention relates to computer implemented method that enables the generation of a virtual design of a lighting device and that determines the components for the virtually designed lighting device. The computer implemented method comprises four main steps and will be performed on a computing device or system. First 100, the computing device receives desired lighting output information indicative of a desired lighting output. Then 102, it selects an initial virtual lighting device able to generate the desired lighting output. Subsequently 104, it adapts parameters of the initial virtual lighting device for generating the virtual design of the lighting device while retaining the desired lighting output. Finally 106, the components 802-810, 814, 816 for the virtually designed lighting device are determined based on the virtual design of the lighting device and on the desired lighting output information, wherein the step of determining the components comprises: determining 600 a number of lumens based on the desired lighting output, (Continued)

determining 602 a number of light emitters and a type of the light emitters 802 based on the number of lumens and based on the desired lighting output and determining 604 a number of drivers and a type of the drivers 810 based on the number and type of light emitters.

15 Claims, 8 Drawing Sheets

(51) Int. Cl.
*H05B 47/155* (2020.01)
*G06F 111/02* (2020.01)

(58) Field of Classification Search
CPC ...... G06F 30/00; G06F 2111/02; G06F 17/50; H04N 9/3194; H05B 45/10; H05B 45/22; H05B 47/155; H05B 45/00; G06Q 30/0613; G06Q 30/0631; G06Q 30/0621
See application file for complete search history.

(56) References Cited

U.S. PATENT DOCUMENTS

| | | | | |
|---|---|---|---|---|
| 2010/0110682 A1* | 5/2010 | Jung | ................. | H05B 45/22 362/249.02 |
| 2010/0315833 A1* | 12/2010 | Holman | ............... | G02B 6/0078 362/607 |
| 2011/0035404 A1* | 2/2011 | Morgan | ............... | H05B 47/155 707/769 |
| 2011/0115413 A1* | 5/2011 | Erickson | .............. | H05B 47/155 315/312 |
| 2011/0175533 A1* | 7/2011 | Holman | .................... | E04B 9/32 315/130 |
| 2011/0320998 A1 | 12/2011 | Perry et al. | | |
| 2012/0080944 A1* | 4/2012 | Recker | ................... | H05B 45/10 307/25 |
| 2012/0206050 A1* | 8/2012 | Spero | .................. | F21V 23/0464 315/152 |
| 2013/0158952 A1* | 6/2013 | Liebel | ...................... | F21S 2/00 702/182 |
| 2015/0127304 A1* | 5/2015 | Cassarly | ............. | G02B 27/0012 703/1 |
| 2015/0278896 A1* | 10/2015 | Seuntiens | .......... | G06Q 30/0613 705/26.41 |
| 2015/0286724 A1* | 10/2015 | Knaapen | ................. | G06F 30/00 703/1 |
| 2016/0360167 A1* | 12/2016 | Mitchell | ............. | H04N 9/3194 |

FOREIGN PATENT DOCUMENTS

| | | |
|---|---|---|
| WO | 2014064631 A2 | 5/2014 |
| WO | 2014064634 A1 | 5/2014 |
| WO | 2014087274 A1 | 6/2014 |
| WO | 2015011666 A2 | 1/2015 |

* cited by examiner

COMPUTER IMPLEMENTED GENERATION OF A VIRTUAL DESIGN OF A LIGHTING DEVICE

CROSS-REFERENCE TO PRIOR APPLICATIONS

This application is the U.S. National Phase application under 35 U.S.C. § 371 of International Application No. PCT/EP2016/069893, filed on Aug. 23, 2016, which claims the benefit of European Patent Application No. 15184768.8, filed on Sep. 11, 2015. These applications are hereby incorporated by reference herein.

FIELD OF THE INVENTION

The method relates to a computer implemented method, a computer program product and a computer readable storage medium for generating a virtual design of a lighting device and for determining components for the virtually designed lighting device.

BACKGROUND

There is a need for lighting devices that are personalized to the needs and wishes of users. In recent years, this personalization has been focused on selecting a design of luminaire that matches the specific needs and wishes of a user. In patent application WO 2014064634, a method is proposed that assists a user in selecting a lighting device based on a scene and lighting effect selected by the user. A problem that a user may experience with this method is that the selected lighting device is a stock item and thus not unique to the specific user. Additionally, the scenes or lighting effects that a user can select may be limited such that the user cannot choose the specific lighting effect he/she wants to achieve. Finally, the stock lighting devices might not be suitable to create the specific lighting effect that needs to be achieved.

Patent application WO 2014087274 A1 relates to assisting a user in selecting a lighting device design through receiving an image of a scene and analyzing this image in order to select or generate a lighting device design. The analysis can comprise determining the presence of a pattern, material or color in the scene and a lighting device design can be selected (e.g. from an electronic catalogue) that comprises a similar pattern, material or color. The user may be first presented a lighting effect as part of a scene (e.g. broad beam down light from the center of the ceiling applied to a living room), allowing the user to choose the lighting effect prior to choosing the lighting device design. Next the user selects or designs the lighting device design. Selecting a lighting device design can comprise selecting a lighting device design from a set of lighting device designs (e.g. from an electronic catalogue of lighting device designs). Designing a lighting device design can comprise, for example, the user using a computer aided design application to design a lighting device design, the user selecting one or more lighting device design modules (e.g. selecting an optical module, a light source module and a fixture module) or a combination of these (e.g. the user selecting an optical module and a light source module and subsequently designing the fixture or part of the fixture such as the lampshade).

U.S. patent application US 20110320998 A1 relates to an LED lighting system design tool. The system of D2 may include a database configured to store information including characteristics of a plurality of components. The system may further include a server in communication with the database and configured to receive design parameters indicative of characteristics of an LED lighting solution. The server may be further configure to: determine a plurality of LED lighting array designs, each design including at least one of a parallel and a series arrangement of LEDs and configured to provide an amount of light specified by the design parameters; determine, for each one of at least a subset of the plurality of LED lighting array designs, an LED driver design configured to power the one of the LED lighting array designs; and generate at least one LED lighting solution, each LED lighting solution including one of the LED lighting array designs combined with one of the LED driver designs configured to power the one of the LED lighting arrays. The system of Document D2 may further comprise a user device with a user interface which allows the user of the user device to specify the design requirements for LED lighting solutions. The user interface may allow for the filtering of the set of LED array designs. The filtering may be performed by a filtering module of the LED design tool application, and may allow for filtering of the LED array designs by the user device according to various parameters. Filtering parameters may include LED lumens.

SUMMARY OF THE INVENTION

It is an object of the invention to provide a computer implemented method and computer program product which enables the generation of a virtual design of a lighting device and that additionally enables the determination of the components of the virtually designed lighting device.

According to a first aspect of the invention the object is achieved by a computer implemented method for generating a virtual design of a lighting device and for determining components for the virtually designed lighting device, the computer implemented method comprising the steps of:
  receiving desired lighting output information indicative of a desired lighting output;
  selecting an initial virtual lighting device able to generate the desired lighting output;
  adapting parameters of the initial virtual lighting device for generating the virtual design of the lighting device while retaining the desired lighting output; and
  determining the components for the virtually designed lighting device based on the virtual design of the lighting device and on the desired lighting output information, wherein the step of determining the components comprises:
  determining a number of lumens based on the desired lighting output;
  determining a number of light emitters and a type of the light emitters based on the number of lumens and based on the desired lighting output; and
  determining a number of drivers and a type of the drivers based on the number and type of light emitters. The computer implemented method can, for example, be implemented as a computer application that runs on a laptop, smartphone or tablet. The computer implemented method can be used by a user to generate a virtual design of lighting device that can be fabricated specifically for said user. A virtual design is defined as the design of a luminaire on a computing device such as, for example, but not limited to, a laptop, smartphone or tablet. The computer implemented method will also determine the components necessary for the virtually designed lighting device such that the virtually designed lighting device can be fabricated. These components at least comprise a non-light-emitting electronic hardware element, such that this computer implemented method advances over prototyping tools that only regard elements intended for the creation of a lighting output. Additionally, this facilitates the fabrication of a luminaire. By using fabrication techniques such as, but not limited to, 3D printing the body of the virtually designed lighting device can be fabricated. Combining the body with the determined components allows the complete fabrication of a lighting device. It is possible that a lighting professional could fabricate the device based on the virtual design and the determined components but it is also possible that user uses the computer implemented method and subsequently fabricates his or her designed lighting device, or has his or her lighting device design fabricated in a retail environment.

The computer implemented method is different from the prior art as the method allows the user to specify the desired lighting output as well as the lighting device design. This is advantageous as a user can now specify its requirements better. Additionally, the computer implemented method allows a user to adapt the parameters of the initial virtual lighting device hereby personalizing the virtual design. This is different than in the prior art patent application mentioned herein before, as the virtually designed lighting device will not be a stock item and will be unique to the user's wishes.

The number of lumens is a good basis for determining the components of a lighting device. Therefore, it is propitious to do this first. Next, it is beneficial to determine the number and type of light emitters as the light emitting components are basis for all other components in a luminaire. Further, it is advantageous to determine the components used to drive the light emitters as the drivers together with the light emitters make up the biggest part of the components that will be placed in a luminaire.

The step of determining the components for the virtually designed lighting device is advantageous as it allows further customization of the lighting outputs of a lighting device.

In an embodiment of the computer implemented method, the hardware elements comprise at least light sources, drivers of the light sources, power supply and cabling.

This is advantageous as the light sources, drives of the light sources, the power supply and the cabling represent a large part of the lighting device and re-use of knowledge of these components eases the fabrication. Note that the power supply can be both an internal power supply such as a battery and an external power supply. In the latter case the power supply will thus be a cable leading to a mains power supply, i.e. a cable with a power plug at the end.

In an embodiment of the computer implemented method, the step of receiving a desired lighting output information comprises:
  receiving an application context and a physical context, wherein the application context at least comprises a purpose of the lighting output and wherein the physical context at least comprises dimensions of a region that is being illuminated by the lighting output.

It is advantageous that the desired lighting output information comprises an application context and a physical context as the desired lighting output will then be based on the application context and the physical context.

It is advantageous that the application context at least comprises the purpose of the lighting output. The application context will thus indicate how the light emitted by the to-be-designed lighting device will be used. This information is a good indication of the desired lighting output.

Additionally, it is advantageous that the physical context at least comprises the dimensions of a region that is being illuminated by the lighting output. Note that a region can indicate both a three dimensional (3D) space that is being illuminated and a two-dimensional (2D) surface that is being illuminated. For example, in the case of a ceiling luminaire the region that is being illuminates is three dimensional whereas in the case of a desk luminaire the region that is begin illuminated is two dimensional. Note that a luminaire, in general, will always light a three dimensional space (a luminaire using lasers for the generation of light might be an exception to this rule). However, the dimensions of the region indicate the region that a user wants to be illuminated.

It is clear that the desired lighting output depends heavily on the dimension of a region that is being illuminated and that it is therefore advantageous to take these dimension into account.

Combining both the application context and the physical context is beneficial as the purpose of the lighting output combined with the physical dimensions of the lighting output give a clear indication of the desired lighting output.

In an embodiment of the computer implemented method, the step of receiving a desired lighting output information further comprises:
  visualizing an exemplary lighting output based on the application context and physical context; and
  receiving feedback on the exemplary lighting output for determining the desired lighting output based on the exemplary lighting output and based on the feedback.

It is beneficial to display the desired lighting output as this allows a user to check if the application context and physical context yield the lighting output (s)he desires. In order to fine-tune the desired lighting output, it is advantageous that the computer implemented method has a step of receiving feedback on the exemplary lighting output, such feedback may inturn trigger re-iterating over previous steps.

In an embodiment of the computer implemented method, the computer implemented method further comprises:
  receiving light distribution information indicative of the light distribution of the desired lighting output; and
  visualizing an exemplary lighting output based on the application context, physical context and the light distribution information.

In order to specify the desired lighting output further it is beneficial that the computer implemented method has a step of receiving light distribution information. The light distribution can have a large effect on the desired lighting output and is therefore a valuable input parameter. For example, if a user specifies that he or she wants directional light, the desired lighting output will be significantly different from a user specifying he or she wants diffuse light. This will also have an impact on the virtually designed lighting device.

In an embodiment of the computer implemented method, the physical context further comprises at least one of the following information types:
  target area information indicative of a target area, wherein the target area information can comprise dimensions of the target area, the material of the target area and the color of the target area;
  external light source information indicative of external light sources also illuminating the region that is being illuminated by the lighting output;
  environmental information indicative of the environment of the target area, wherein the environmental information can comprise the color of the environment of the target area and the material of the environment of the target area; and color information indicative of the desired color of the lighting output.

It is desirable to specify the physical context of the lighting device further as this can specify the desired lighting output and thus refine the virtual design more. The use of several specifications is possible and advantageous.

First, it might be advantageous to specify a specific target area, the material of the target area and the color of the target area. Example situations where this might be advantageous are lighting a painting, other art, or a desk.

Second, it might be advantageous to specify external light sources such that the to-be-illuminated region is not overexposed or such that the desired lighting output blends well with the external light sources.

Third, it might be advantageous to specify the environment of the target area. The color and material of the target area can be specified. This can be advantageous to prevent unwanted reflections. Moreover, it can be advantageous to select a color of the light that blends well with the environment and the subject being illuminated.

Fourth, it might be advantageous to specify the colors of the desired lighting output as the color will have a great effect on the perception of the light.

In an embodiment of the computer implemented method, the application context further comprises at least one of the following information types:

user information indicative of the users of the lighting output, wherein the user information comprises at least one of the following information types:
age information indicative of an age of the users,
information on a biorhythm of the users,
eye quality information indicative of a quality of the eyes of the users, and
demographic information indicative of a cultural background and or nationality of the users; and user context information indicative of at least one of the following information types:
information on a user activity, and
information on a state of mind of the user the lighting output is aimed to create.

It is desirable to specify the application context further as this can specify the desired lighting output and thus the virtual design more. The use of several specification is possible and advantageous.

First, it is advantageous to know more about the users of the lighting output. It is known that aging results in the clouding of the lenses of the eyes, also referred to as cataract. In order to compensate for the clouding of the lenses, the intensity of the desired lighting output may be increased. Therefore, the age of the users is interesting to know. Also, it might be advantageous to know more on the eye quality of the users as, also for younger users, the intensity of the desired lighting output may be adapted to match the eye quality of the users. Moreover, it can be beneficial to adapt the desired lighting output based on demographic information such as cultural background or nationality of the users. It is known that the preferred color temperature of white light differs for people from different cultural backgrounds such that the desired lighting output can be changed based on demographic information. Finally, it is advantageous to have information on the biorhythm of users such the desired lighting output can be made time dependent and the virtual design can be based on this time dependency.

Second, it might is advantageous to know more on the context in which the user will use the virtually designed lighting device. Different activities will, for example, yield different lighting requirements. Additionally, it is advantageous to have information on the state of mind of the user the lighting output is aimed to evoke as the intensity and color of the lighting output can have an effect on the state of mind of a user.

In an embodiment of the computer implemented method, the physical context further comprises pattern information indicative of a desired light pattern on the target area and wherein the computer implemented method further comprises:

generating a virtual lighting device able to generate the desired light pattern on the target area; and
selecting the generated virtual lighting device as the initial virtual lighting device.

Allowing a user to use the virtually designed lighting device to generate a light pattern on a target area is advantageous as it opens up more possibilities to specify a lighting output.

In an embodiment of the computer implemented method, the step of adapting parameters of the initial virtual lighting device for generating the virtual design of the lighting device while retaining the desired lighting output comprises adapting at least one of the following parameters:

a size of the lighting device,
a shape of the lighting device,
a material of the lighting device,
a color of the lighting device,
a type of light sources,
a number of light sources,
a grouping or addressability of the number of light sources,
an orientation of light sources,
a shape of the light sources,
a size of the light sources,
a color of light emitted by the light sources,
an inner shape of the lighting device,
a finish of the inner shape of the lighting device
a thickness of a wall of the lighting device, and
an attachment mechanism of the lighting device.

By adapting the parameters of a lighting device a user can generate is own unique lighting devices. Therefore, it is advantageous that parameters can be adapted. The amount of parameters that can be adapted may depend on the fabrication technique used to fabricate the virtually designed lighting device and on the skill level of the user. A user that is skilled in the designing of lighting device may be able to change more parameters than a user that has never designed a lighting device before.

In an embodiment of the computer implemented, the step of determining the components for the virtually designed lighting device further comprises:

receiving a desired number and a desired type of user interaction elements of the virtually designed lighting device; and
determining a number of control components and a type of control components based on the desired number and type of user interaction elements and based on the desired lighting output.

For some luminaires it is advantageous to have a user interaction element such as a light switch or a smart phone application that can control the status of the light source (on or off), the dimming level of the light source and/or the color of the light source. Therefore, it is advantageous to have a step in the computer implemented method where a user can indicate the preferred user interaction elements. Subsequently, it is advantageous that the computer implemented method automatically determines the control components necessary for the preferred user interaction elements.

In an embodiment of the computer implemented method, the step of determining the components for the virtually designed lighting device further comprises:
- checking if the number and types of drivers, light emitters and/or control components can be built in the virtually designed lighting device;
- adapting either the number and types of drivers, light emitters and/or control components or the design of the virtually designed lighting device based on the outcome of the checking step while retaining the desired lighting output.

It is advantageous that the virtually designed lighting device can be fabricated easily. Therefore, it is beneficial to check if the number and types of drivers, light emitters, and, in the case that there are user interaction elements, if the number and types of control components can be placed in the virtually designed lighting device. If the determined components cannot be placed in the virtually designed lighting device, it is useful to either adapt the design of the virtually designed lighting device of the determined components. This can be done automatically but a user can also indicate if he/she wants the design to prevail over the components or vice versa. Additionally, it is possible that both the design and the determined components are adapted. Constraints on the adaptions may be set by a user or may be set automatically.

In an embodiment of the computer implemented method, the step of determining the components for the virtually designed lighting device based on the virtual design of the lighting device and on the desired lighting output, wherein the components at least comprise a non-light-emitting electronic hardware element for use in the virtually designed lighting device, further comprises:
- determining the electronic components based on the number and types of drivers, light emitters and/or control components, wherein the electronic components comprise at least a power supply and cabling of the virtually designed lighting device.

To ease the fabrication of the virtually designed lighting device and to make the design of said virtually designed lighting device more complete, it is beneficial to determine the electronic components of the lighting device based on the previously determined components such as the light emitters, drivers and control components. The electronic components, can be, for example, the wires connecting the different components, batteries and power cables. Note that the notion of a power supply can be interpreted as both an internal power supply, such as a battery, as well as the cable to the external power supply. The components herein referred to as power supply therefore also indicate the method of power supply.

In an embodiment of the computer implemented method, the computer implemented method further comprises:
- determining optical elements for the virtually designed lighting device based on the desired lighting output and the determined components of the virtually designed lighting device.

Additional optical elements can be placed in the luminaire to better achieve the desired lighting output. For example, different diffusers can be used to achieve different distributions. Additionally, for example, lenses, mirrors, prisms or optical fibers can be used to achieve a desired lighting output. Therefore, it is advantageous to determine additional optical elements based on the desired lighting output.

In an embodiment of the computer implemented method, the computer implemented method further comprises:
- adapting the thickness and opacity of the walls of the virtually designed lighting device based on the desired lighting output and the determined components of the virtually designed lighting device.

The thickness and opacity of the walls of a lighting device can have a big impact on the lighting output a lighting device creates. Therefore, it is advantageous to adapt these parameters.

In an embodiment of the computer implemented method, the computer implemented method further comprises:
- visualizing, after at least one step, the virtually designed lighting device and or the exemplary lighting output;
- receiving feedback on the virtually designed lighting device and or on the exemplary lighting output; and
- taking into account the received feedback in the subsequent method steps.

It is beneficial to get feedback from the user creating the design of the lighting device. Therefore, it is advantageous to show the user the virtually designed lighting device and or the exemplary lighting output such that the user can indicate changes that have to be made either to the design or to the lighting output. This allows a user to better create a specific and unique lighting device.

According to a second aspect of the invention the object is achieved by a computer program product for a computing device, the computer program product comprising computer program code to perform the previously described computer implemented method when the computer program product is run on a processing unit of the computing device.

It is advantageous if the computed implemented method described can be performed on a variety of computing devices such as smart phones, tablets, laptops and smart wearable devices. Therefore, it is beneficial to have a computer program product comprising software to perform the computer implemented method.

According to a third aspect of the invention the object is achieved by a computer readable storage medium for storing the computer readable computer program product.

According to a fourth aspect of the invention the object is achieved by a system comprising a user interface for interfacing with a user, and a processor configured to:
- receive (100) desired lighting output information indicative of a desired lighting output;
- select (102) an initial virtual lighting device able to generate the desired lighting output;
- adapt (104) parameters of the initial virtual lighting device for generating the virtual design of the lighting device while retaining the desired lighting output; and
- determine (106) the components (802-810, 814, 816) for the virtually designed lighting device based on the virtual design of the lighting device and on the desired lighting output information, by
  - determining a number of lumens based on the desired lighting output;
  - determining a number of light emitters and a type of the light emitters based on the number of lumens and based on the desired lighting output; and
  - determining a number of drivers and a type of the drivers based on the number and type of light emitters.

It is advantageous if the computed implemented method described can be performed on a variety of computing devices such as smart phones, tablets, laptops and smart wearable devices. Therefore, it is beneficial to have a system in which the processor is configured to carry out the computer implemented method. Note that the system can be implemented as a standalone device but that the processing requirements can also be distributed over a number of devices. The user interface could then for example be implemented on a smartphone but the processor can be located elsewhere. The user interface can be coupled to the processor using any suitable network.

BRIEF DESCRIPTION OF THE DRAWINGS

The above, as well as additional objects, features and advantages of the disclosed computer implemented method, computer program product and computer readable storage medium will be better understood through the following illustrative and non-limiting detailed description of embodiments of devices and methods, with reference to the appended drawings FIGS. 1 to 7.

All the figures are schematic, not necessarily to scale, and generally only show parts which are necessary in order to elucidate the invention, wherein other parts may be omitted or merely suggested.

DESCRIPTION

The main aspect of the invention is a computer implemented method that allows a user to generate a virtual design of a lighting device. A virtual design is defined as the design of a lighting device on a computing device such as, but not limited to, a laptop, smartphone or tablet. The computer implemented method not only allows a user to generate a virtual design of a lighting device but also determines the components for that lighting device. The components are for example the light emitters, the drivers of the light emitters, user interaction elements and the wiring within the lighting device. The result of the computer implemented is thus a virtual design of a lighting device that comprises both the housing of the components as well the components. Therefore, the virtual design of the lighting device will provide both the aesthetics, how the lighting device will look, as well as the internal functioning of the lighting device.

Using the virtual design, a lighting device such as a luminaire can be fabricated. In an embodiment of the invention the housing of the components can be fabricated using a 3D printer. Combining the housing with the components, which can be stock products, results in the virtually designed lighting device. In this way, a retail store can offer a user the computer implemented method to determine the design of the lighting device he or she wants and can then immediately fabricate that lighting device for the user.

The present invention is different from the prior art as the user starts by indicating the lighting output (s)he desires and then continues to adapt parameters of an initial design to create their own, unique, virtual design of a lighting device.

Figure 1:
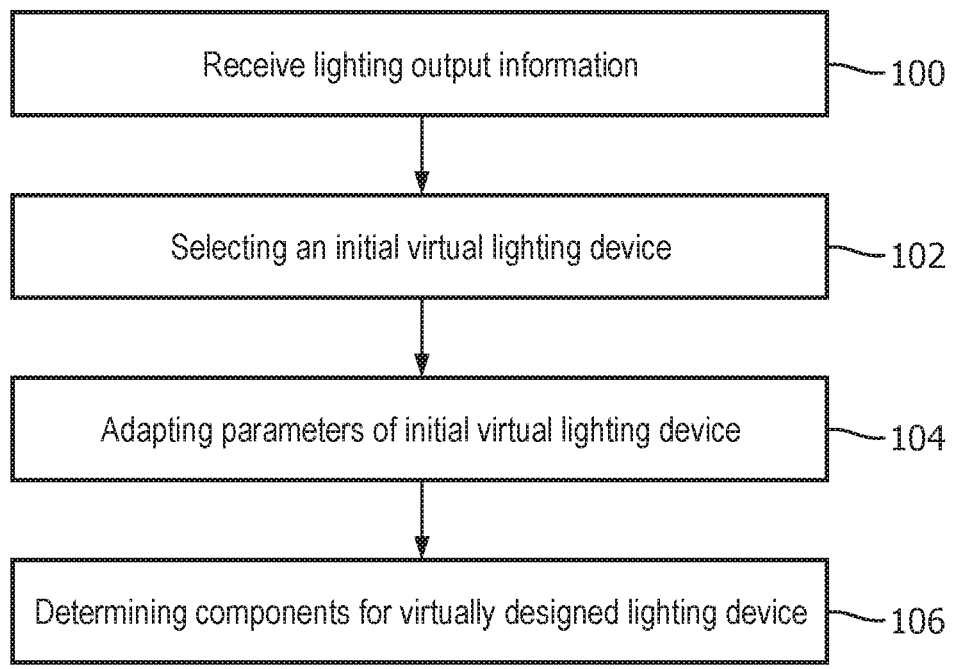
FIG. 1 schematically shows the computer implemented method for generating a virtual design of a lighting device and for determining components for the virtually designed lighting device.

The computer implemented method will be performed on a computing device or computing system. The method comprises four main steps which are schematically shown in FIG. 1.

A first step 100 is: receiving desired lighting output information indicative of a desired lighting output. In this step a user provides the computing device with desired lighting output information that is indicative of a desired lighting output. The desired lighting output information in general comprises parameters that a user can put in such that also untrained users can provide this information. However, for more advanced user, the desired lighting output information might comprise digitally created lighting outputs.

A second step 102 is: selecting an initial virtual lighting device able to generate the desired lighting output. Based on the desired lighting output a lighting device is selected. For example, if the desired lighting output is a small area that is brightly lit, a spotlight may be selected. However, if the desired lighting output is a large volume that is diffusely lit a ceiling lamp may be selected as the initial virtual lighting device. It is also possible that multiple lighting devices are selected and that a user gives input as to which lighting device (s)he prefers as the initial virtual lighting device. The selecting of the initial virtual lighting device will be based on rules coupling lighting outputs to initial virtual designs. Said rules can be implemented by software in the computing device.

A third step 103 is: adapting parameters of the initial virtual lighting device for generating the virtual design of the lighting device while retaining the desired lighting output. The initial virtual design can be adapted to change the design such that the final design matches the desires of a user. While adapting the design, the desired lighting output is substantially retained. This means that there are restrictions towards the parameters that may be changed by the user. If the initial virtual lighting device is a spotlight, for example, it is most likely not possible to add diffusers to the design. Some parameters that do not influence the lighting output, such as the color of the luminaire, will be able to be changed always. Based on the desired lighting output the computing device determines which parameters may be adapted. This can be implemented by using software implemented rules in the computing device.

A fourth step 104 is: determining the components for the virtually designed lighting device based on the virtual design of the lighting device and on the desired lighting output information. In this step the components of the virtually designed lighting device are determined. After this step, the design of the lighting device is complete and the virtually designed lighting device can be fabricated. In general, the components will be selected from a list of possible components. The selected components will be based on the virtual design and on the desired lighting output but can also depend on the preference of the user, which items are in stock or on previously designed lighting devices.

Figure 2A:
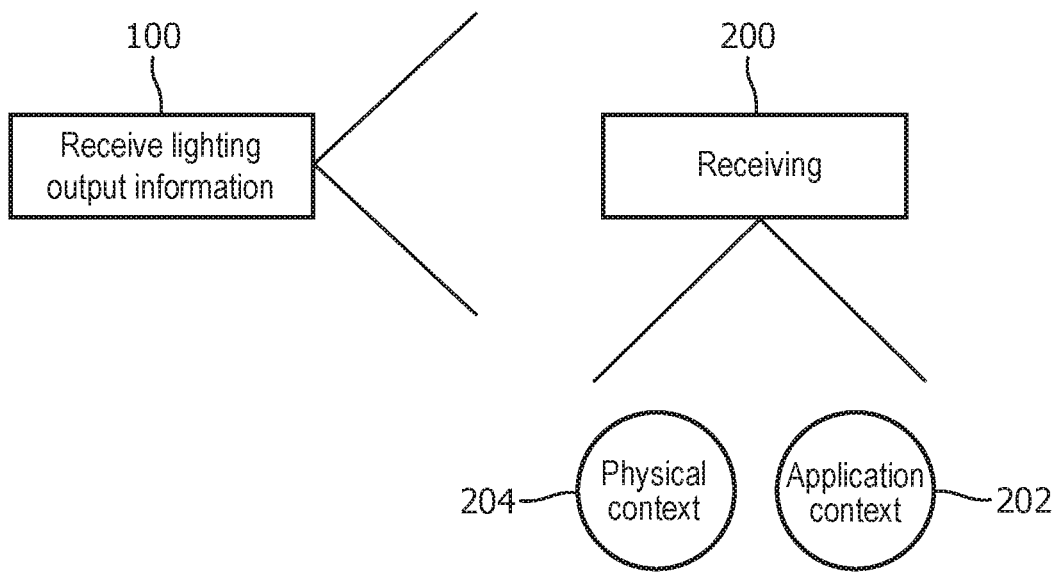
FIG. 2A-C schematically illustrate several embodiments of the step of receiving the desired lighting output information.

There are several possible variants of the first step 100. A basic variant is shown in FIG. 2A. Here the first step comprises receiving 200 an application context 202 and a physical context 204.

The application context 202 at least comprises the purpose of the lighting output. For example if the light is meant for reading, using a computer or if the light is meant as mood lighting. The application context can however also comprise user information and user context information. The user information can comprise information on the age of users, information on the eye quality of the users and or information on the cultural background or nationality of the users. The age and eye quality information will in general have effect on the brightness of the desired lighting output whereas the information on the cultural background or nationality will have an effect on the color and or color temperature of the desired lighting output. The user context information can give information on the activities a user does while having the lighting output turned on. For example if the user watches television when the virtually designed lighting device is on, the desired lighting output might be adapted for this purpose. Additionally, the user context information can give information on the biorhythm of the user and or on the state of mind or mood a user wants to create. This can have effect on a time dependent lighting output and or the color and brightness of the lighting output. In general, the effect of additional input parameters provided by a user will be a more specific lighting output. By using software implemented rules, for example, the effect of the parameters on the desired lighting output is recorded. A skilled person will know how to set these rules and how these can be implemented using software.

The physical context 204 will at least comprises dimensions of a region that is being illuminated by the lighting output. The region can be two dimensional for a desk lamp for example but can also be three dimensional for a ceiling lamp. Additionally the physical context can also comprise information on a target area such as a painting, an object, or a wall. Note that the target area can also be the complete region. The information on the target area can comprise for example the dimensions of the target area, the material of the target area and the color of the target area. The physical context can also comprise information on external light sources that provide light to the region that will be illuminated by the lighting output of the virtually designed lighting device. The physical context can also comprise information on the environment of the target area such as the color of the walls next to a painting and the material of these walls. Finally, the physical context can comprise information on the desired color of the lighting output. Again, software implemented rules, can be used to record the effect of the parameters on the desired lighting output. A skilled person will know how to set these rules and how these can be implemented using software.

Figure 2B:
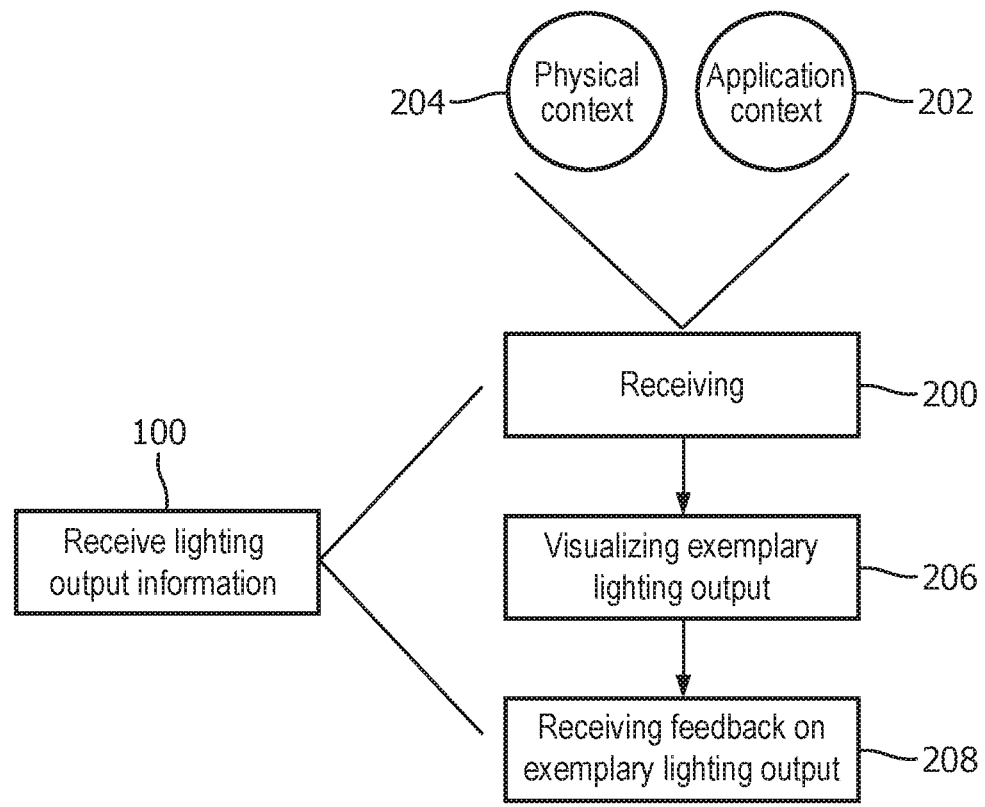

In FIG. 2B a second variant of the first step 100 is shown. Here the first step comprises receiving 200 the application context 202 and the physical context 204, visualizing 206 an exemplary lighting output based on the application context and physical context and receiving 208 feedback on the exemplary lighting output for determining the desired lighting output based on the exemplary lighting output and based on the feedback. The desired lighting output can be, for example, visualized on a screen connected to a personal computer, a laptop screen, or on the screen of a tablet or smartphone. The visualization can be done by rendering engines. What has to be rendered will be based on the application and physical context in combination with rules that will be implemented using software. Such a rule can be implemented as follows:

When the application context indicates a mood light, the light output will be diffuse.

If the physical context indicates a large room a lighting output is created that creates much light i.e. has a bright spot at the origin of the light emitter.

A person skilled in the art will be able to define and implement more of these rules hereby enabling the invention.

A user can give feedback by changing the application context and or physical context and check if the visualized lighting output matches its desired output better. Another way for the user to provide feedback is by using a graphical user interaction (GUI) element. Sliders can for example be used to make a lighting output more or less bright, more or less diffuse and also the color can be changed using sliders or other color pickers. A person skilled in the art can implement the step of giving feedback using many other GUI elements. Sliders are merely used as an example.

Figure 2C:
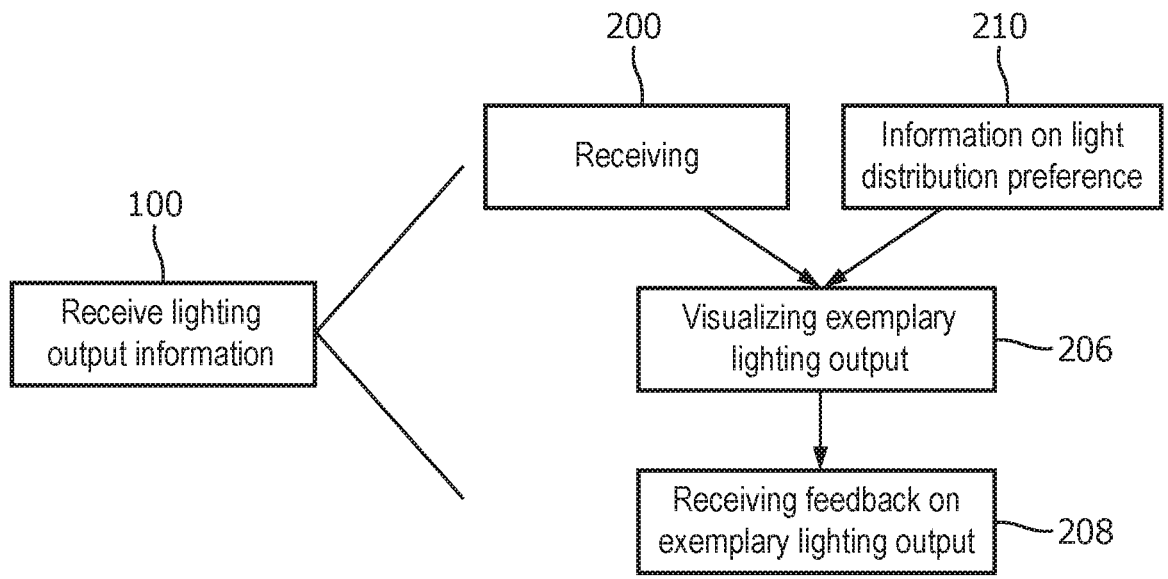

A third variant of the first step 100 is shown in FIG. 2C. Here, the step further comprises receiving 210 information regarding the light distribution that a user prefers. Then, an exemplary lighting output is created based on the physical context, the application context and the light distribution information. This exemplary lighting output is again visualized 206 and feedback can be given 208. The information on the preferred light distribution provides additional input parameters, this means that less assumptions have to be made by the rules that create the desired lighting output.

In general, the application context, physical context and light distribution information will provided by a user to a computing device or system. The computing device or system can for example be implemented as a personal computer, a laptop, a smartphone or a tablet and the user can provide the system with information by using for example a mouse, a keyboard, a touchscreen or any other input method.

The application context and physical context will in general be provided by a user using text-based input or scripting. It is also possible that the system shows the user several options for a parameter from which the user can choose one or more to define its application and physical context. The light distribution information can be implemented likewise. This is preferable for untrained users. However, it is also possible that pictures are uploaded from which the light distribution information can be extracted. Finally, for experience users digital light distribution information can be uploaded. The digital light distribution information can be made in program such as, but not limited to, AutoCAD, Rhino 3D, Adobe Photoshop and 3DS Max.

Figure 3A:
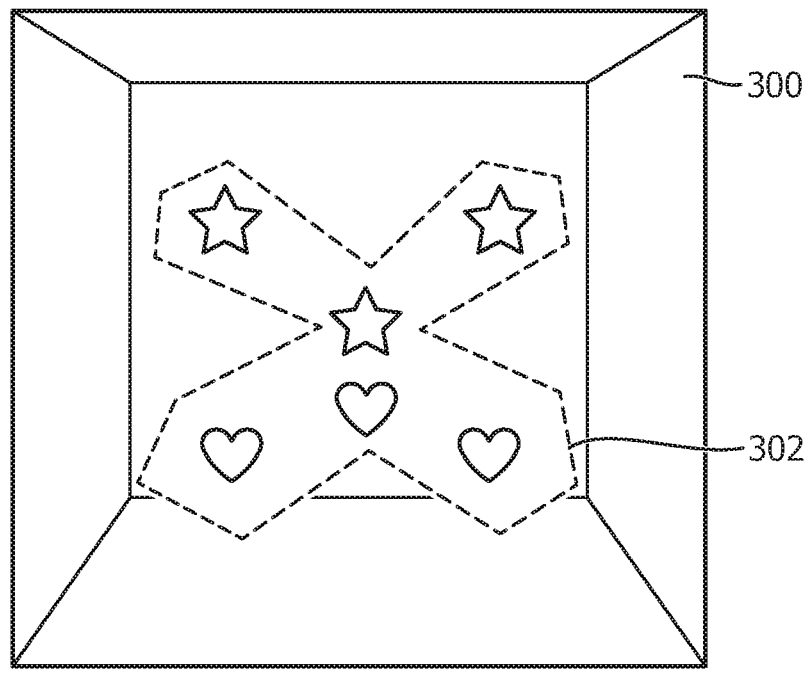
FIG. 3A schematically illustrates a possible desired lighting pattern output.
Figure 3B:
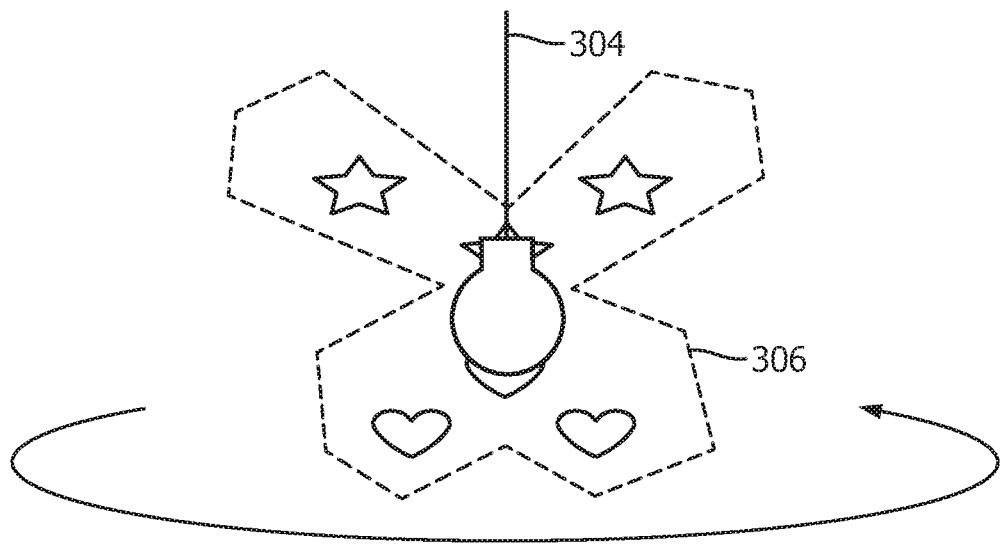
FIG. 3B schematically illustrates an exemplary design of a lighting device able to generate said lighting pattern output.
Figure 4:
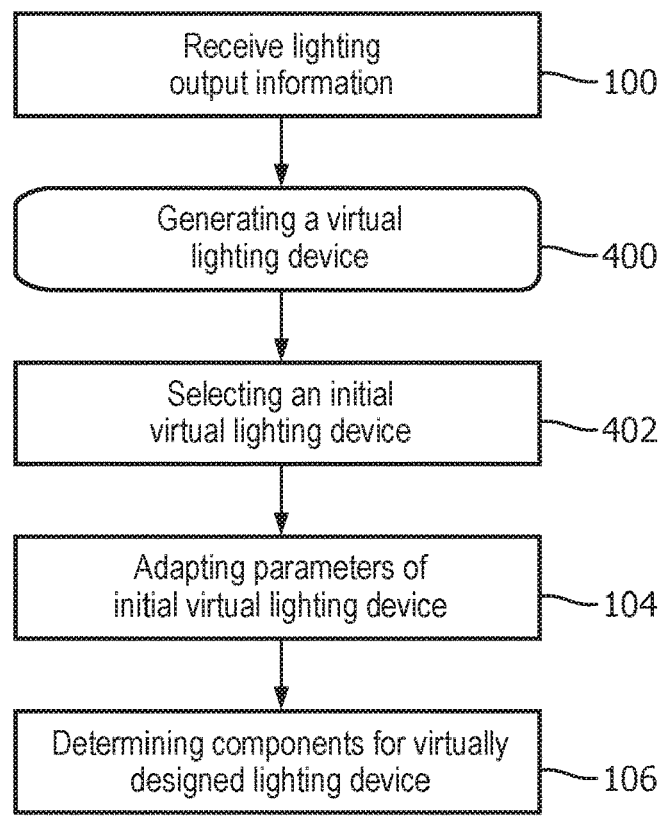
FIG. 4 schematically shows the computer implemented method including the step of generating a virtual lighting device able to generate the desired light pattern.

In a fourth variant of the first step 100, a user provides a light pattern 302, shown in FIG. 3A, that the user wants to create with the virtually designed lighting device. The lighting pattern will be created on target area such as, for example, the wall of a room 300. As shown in FIG. 4, the computing device or system carrying out the computer implemented method will then use an algorithm to generate 400 a virtual lighting device able to generate the desired light pattern on the target area. In a basic example such as shown in FIG. 3B, a virtual lighting device will comprise a light emitter 304 that shines light on a surface on which a distorted form of the pattern 306 is created using contrast differences, color differences or material difference or in which a distorted form of the pattern 306 is cut-out, wherein the distorted pattern has been corrected for the intended projection area so as to create the desired pattern on the target area. When the virtual lighting device is generated, said virtual lighting device is selected 402 as the initial virtual lighting device.

Figure 5:
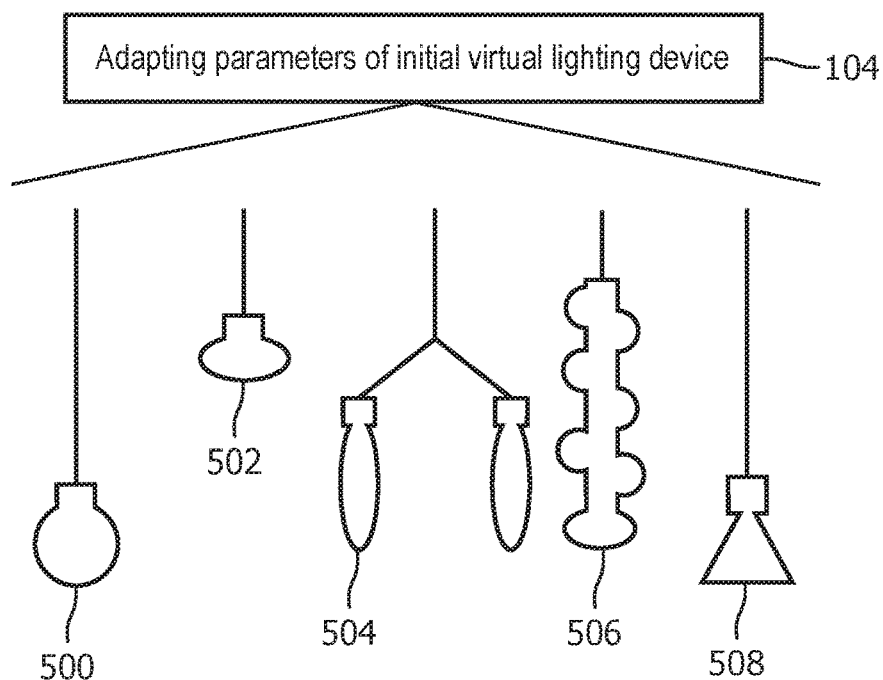
FIG. 5 schematically illustrates how parameters of the initial design can be adapted to create the virtually designed lighting device.

FIG. 5 shows schematically what happens in the third step 104 of adapting parameters of the initial virtual lighting device for generating the virtual design of the lighting device while retaining the desired lighting output. The parameters can be adapted using one or multiple GUI elements. Additionally, it is possible that the computing system provide the user with options that can be adapted. This can be preferable when the desired lighting output does not allow many adaptions. It is possible that the size, shape, material and color of the lighting device can be adapted. If the lighting device 500 is taken to be the initial design, it is shown that both the size and the shape are adapted in design 502 and 508. Moreover, the type, number, grouping, orientation and shape of the light sources may be adapted as well as the grouping or addressability of the number of light sources and the color of the light emitted by the light sources. For example in design 504 and 506 the number of the light sources is adapted. With the addressability it is for example meant that one can indicate if all light sources need to be able to be controlled separately or not. For example, one can imagine that in a lighting device one group of light sources ensures a diffuse effect while another group of light sources enables a spot light type of effect. Then the two groups need to be addressed differently but the light sources within the group may be controlled in the same way. It is also possible to adapt the inner shape of the lighting device, the finish of the inner shape of the lighting device as well as the thickness of the walls of the lighting device/lamp shade/lamp cover. Moreover, it is possible to change the attachment mechanism of the lighting device as is shown in design 504. Note that in FIG. 5 all lighting devices are hanging lamps. This is however not meant as a limitation. For example, starting from a hanging lamp, a standing lamp can be created as well and vice versa.

Figure 6A:
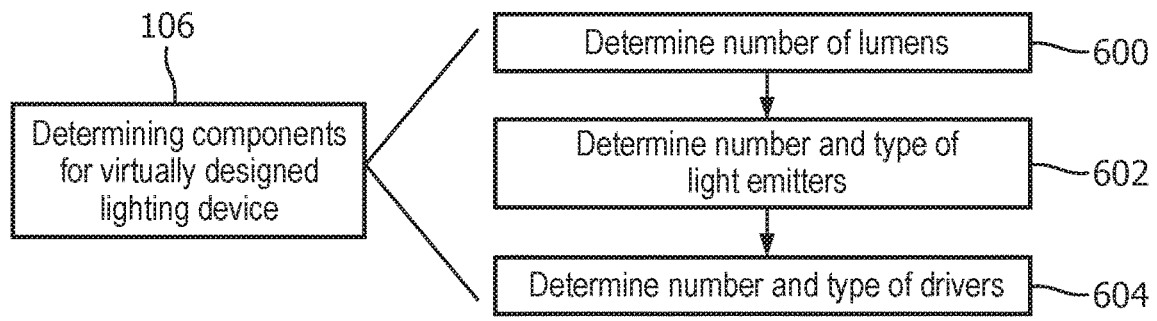
FIG. 6A-F schematically show different embodiments of the step of determining the components for the virtually designed lighting device.
Figure 8A:
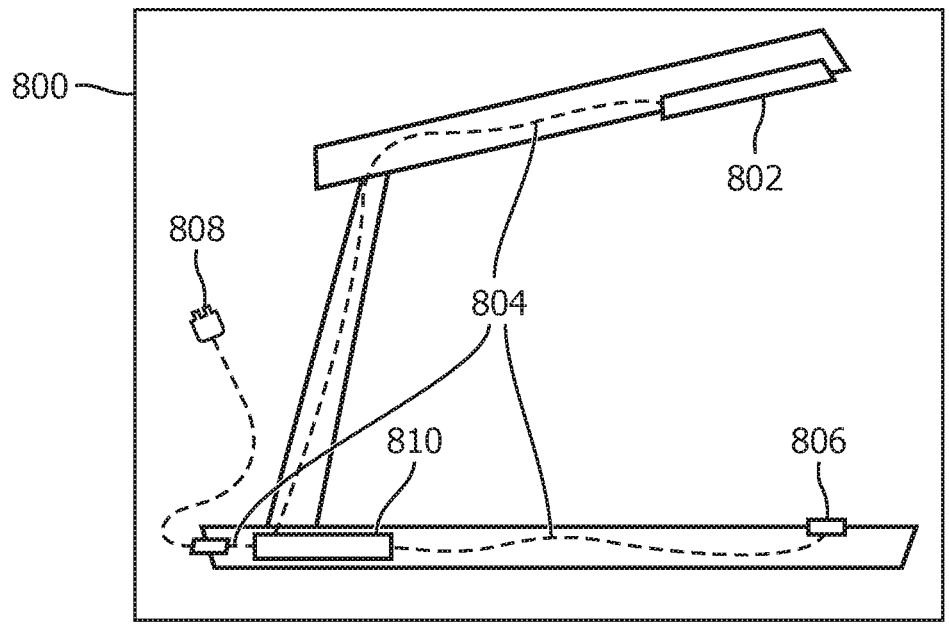
FIG. 8A-B schematically show two variants of a lighting device wherein the determined components are schematically illustrated.
Figure 8B:
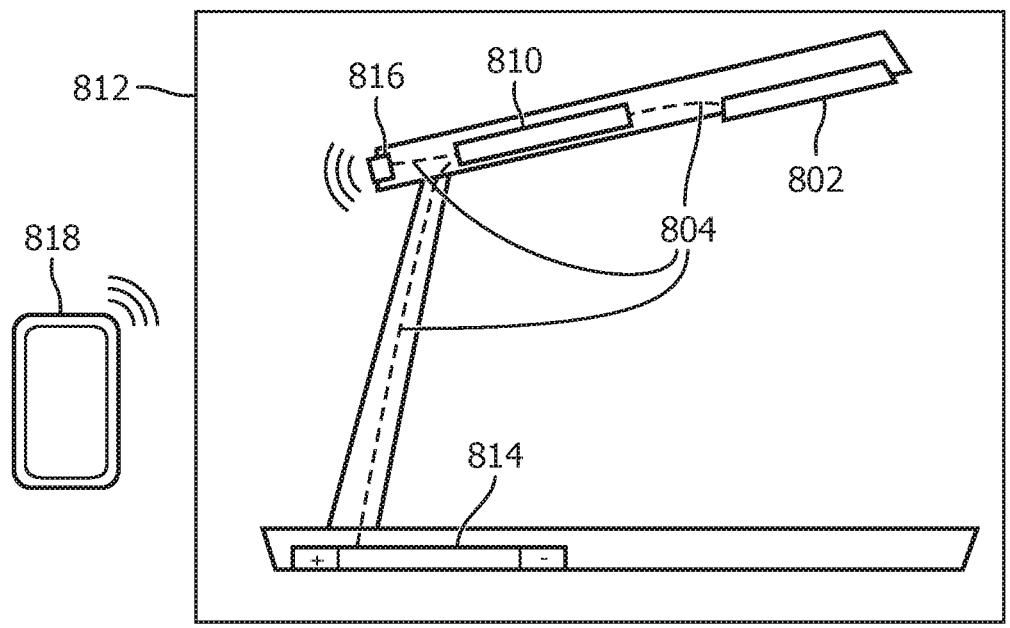

Variants of the fourth step 106 are shown in FIGS. 6A-F. FIGS. 8A and 8B show two virtually designed lighting devices 800, 812 including the determined components 802-810, 814-816. In FIG. 6A a basic variant of the step of determining the components for the virtually designed lighting device based on the virtual design of the lighting device and on the desired lighting output is shown.

First, the number of lumens 600 is determined based on the desired lighting output. This will again be based on rules implemented in the computing device or system. For example, for a room of size x, y lumens are necessary. A skilled person can create many of such rules hereby enabling this step. Then, the number and type of light emitters 802 is determined 602 based on the number of lumens and based on the desired lighting output. In general, first the type of light emitters will be determined and then, the number of light emitters is selected by dividing the number of lumens necessary by the number of lumens provided by the light emitters. This step can be implemented iteratively such that when the number of light emitters is not a round number, a different light emitter is chosen. Also, for example, when it follows that 4 light emitters are needed while the design only allows 2 light emitters to be placed different light emitters may be chosen. Then, based on the number and type of light emitters the number and type of drivers 810 is determined.

Figure 6B:
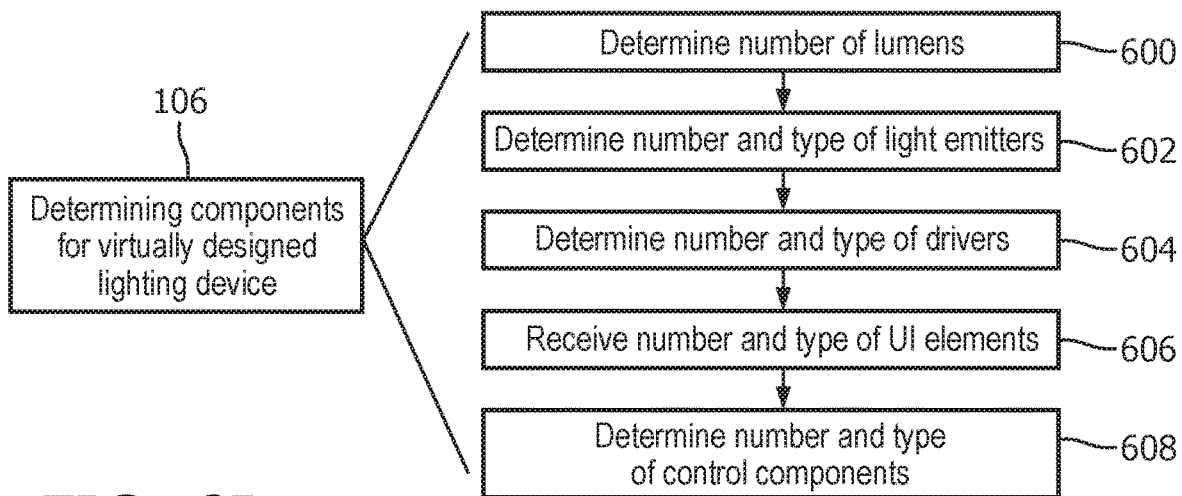

In a second variant, shown in FIG. 6B, the step or determining the components 106 comprises a step of receiving 606 the desired number and type of user interaction elements of the virtually designed lighting device. A user can indicate for example if a light switch 806 is needed, if the lighting device needs dimmers, if (s)he wants to be able to adapt the color of if s(he) wants to be able to control the lighting device through an application on a smartphone 818, tablet, computer or wearable device. In the latter case a wireless transceiver 816 is necessary. The computer implemented method then determines 608 the number and type of control components 806,816 and a type of control components based on the desired number and type of user interaction elements.

Figure 6C:
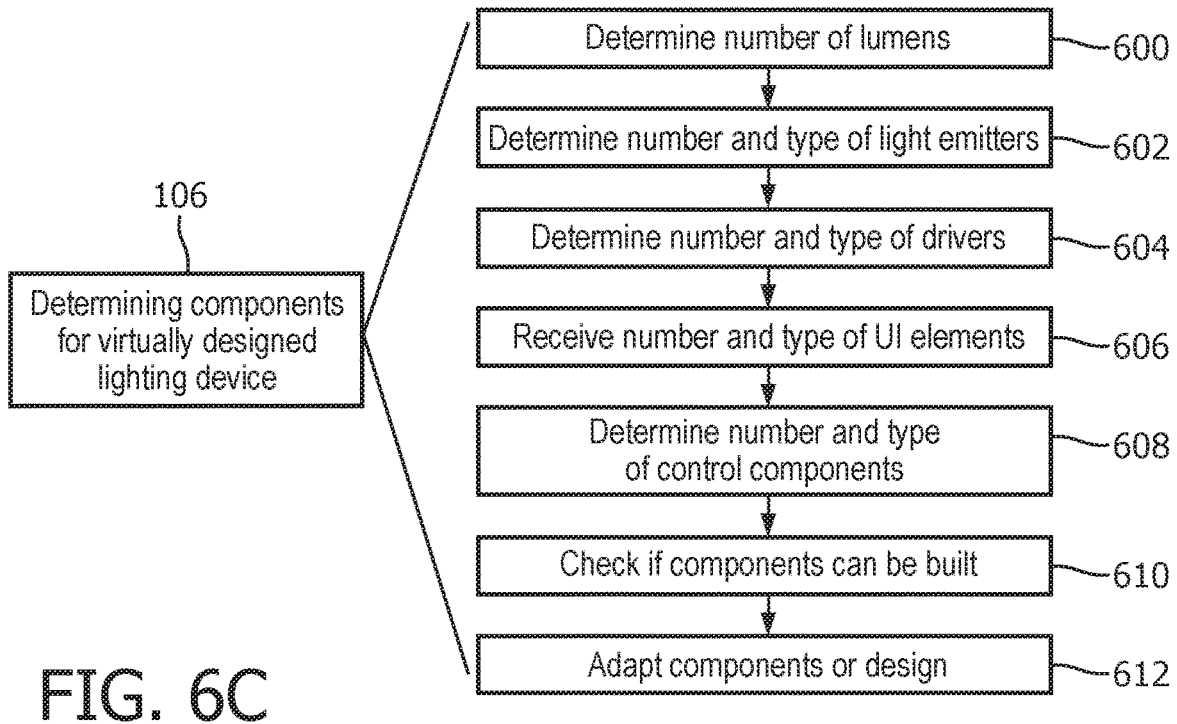

In a third variant, shown in FIG. 6C, the step or determining the components 106 has a checking step 610 built in. In this step it is checked if the number and types of drivers, light emitters and/or control components can be built in the virtually designed lighting device. If the components cannot be built in to the designed device, the components have to be adapted 612 or the design has to be adapted 612. This can be implemented in a variety of ways. It can be done automatically or a user can give input regarding to which aspect, the design or the components, s(he) wants to change.

Figure 6D:
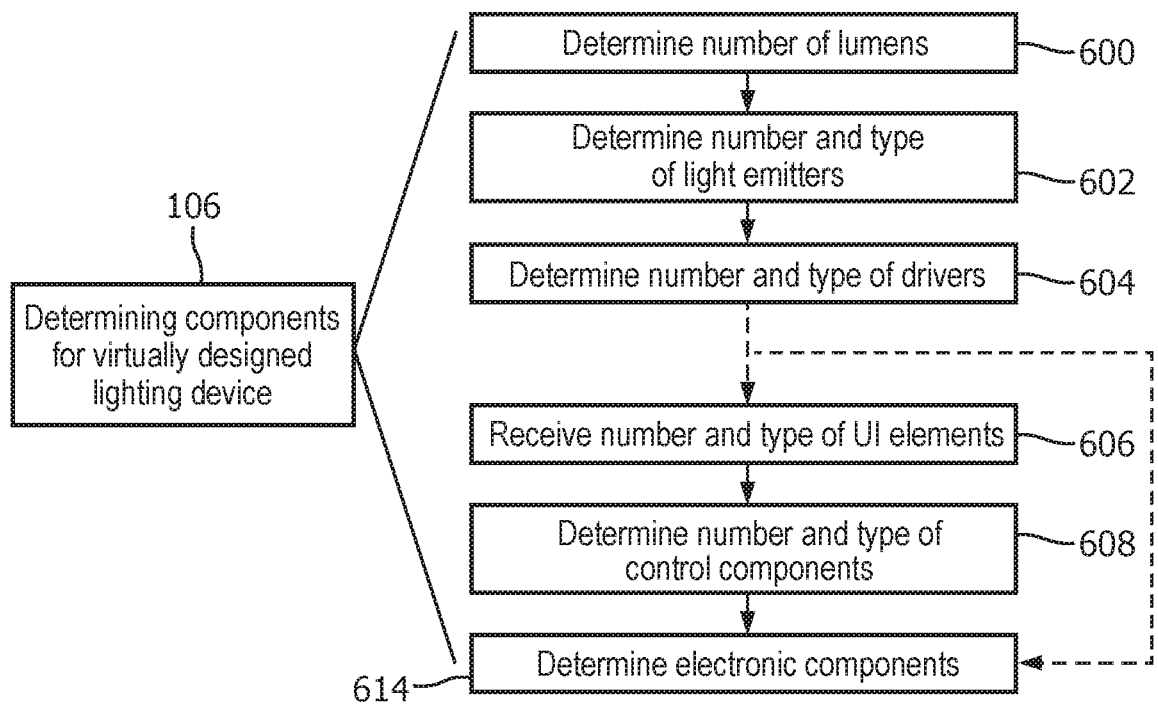

In FIG. 6D shows that the step of determining the components 106 for the virtually designed lighting device can further comprise determining 614 the electronic components 804, 808, 814 based on the number and types of drivers, light emitters and/or control components. As is shown in the figure the electronic components can be determined both when only light sources and drivers are determined as well as when additional user interaction elements are determined. This final step allows a complete design of the virtually designed luminaire and therefore allows a user to fabricate the lighting device more easily. The electronic components, can be, for example, the wires 804 connecting the different components, batteries 814 and power cables 808.

Figure 6E:
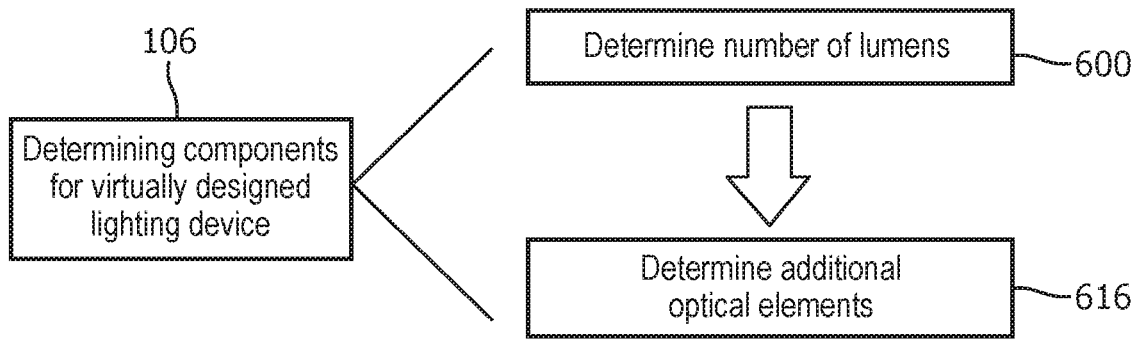

FIG. 6E shows yet a more advanced variant of the step of determining the components 106 for the virtually designed lighting device. A step of determining 616 additional optical elements based on the desired lighting output and the determined components of the virtually designed lighting device is added. The additional optical elements can shape the lighting output more precisely. Examples are diffusers and lenses. The big arrow indicates that this step can be implemented after any of the last steps of FIGS. 6A-D. An exemplary method to implement this step is by having a computing system try the different optical elements it has at its disposal and to place them on the virtually designed lighting device and subsequently check if this yields a lighting output that matches the desired lighting output better.

Note that all of the above embodiments are just exemplary as there are many other methods of determining the components for a lighting device. Also the order of the above embodiments may be switched.

Figure 6F:
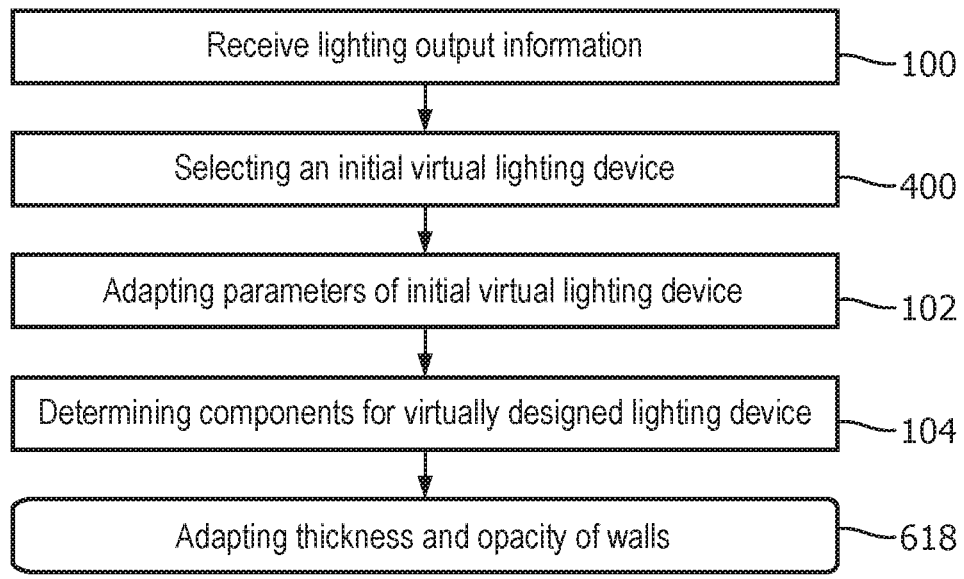

FIG. 6F shows a further example of an embodiment wherein the computer implemented method comprises an additional step of adapting 618 the thickness and opacity of the walls of the virtually designed lighting device based on the desired lighting output and the determined components of the virtually designed lighting device. Note that the thickness of the walls is one of the parameters a user can adapt when making the design. However, this step 617 is different as it is implemented at the end of the design procedure. Since the components are then known such that the system can tweak this final parameter so as to fine tune the lighting output.

Figure 7:
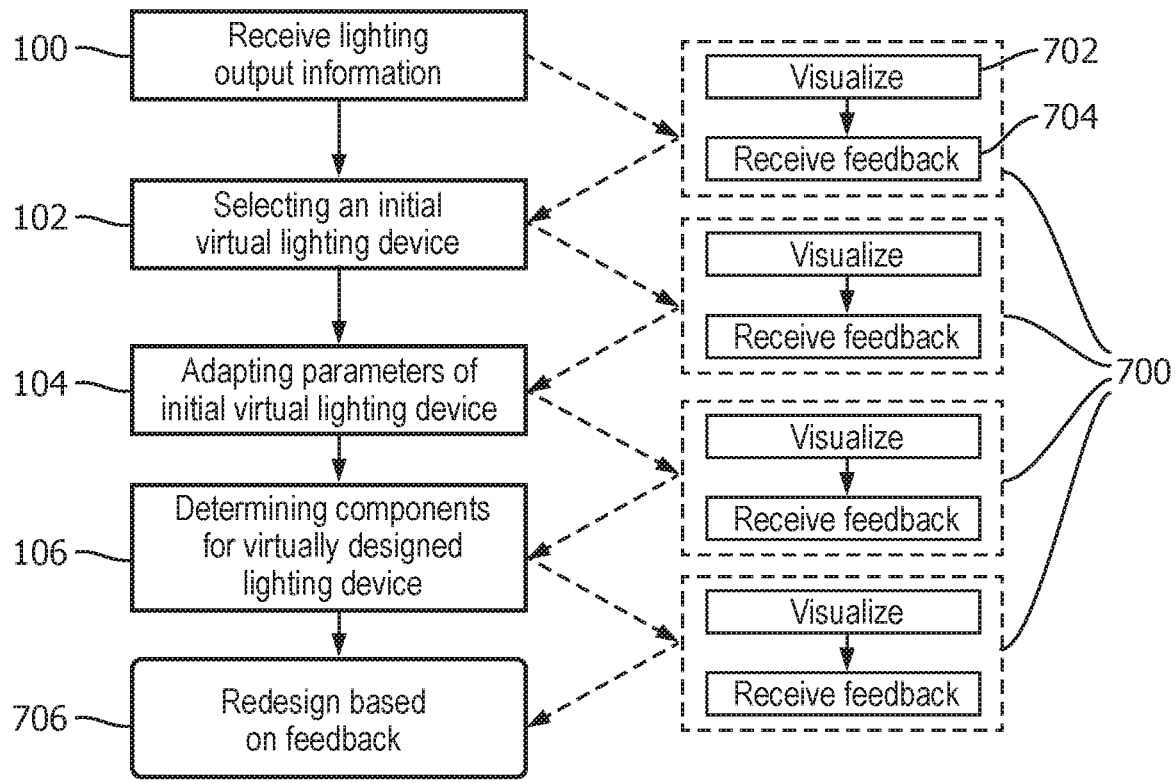
FIG. 7 schematically shows how a feedback step can be implemented in the computer implemented method.

FIG. 7 shows an embodiment where at one or more stages feedback is asked as shown by the dotted boxed marked 700. First, the virtually designed lighting device and or the exemplary lighting output is/are visualized 702 and then the system can receive 704 feedback on the device and or lighting output. This feedback is taken into account in the subsequent method steps. In FIG. 7 this process is shown by dotted arrows leading from a first method step to the feedback box 700 and by dotted arrows leading from the feedback box to a second method step. The dotted arrows leading from the feedback box to a second step indicate that the feedback is used input for the a second method step. Note that after the final step 106, a new step 706 is added which is redesigning the virtually designed lighting device based on the received feedback. Feedback can be given via a GUI element as described above.

Note that although the goal of the invention is to match the desired lighting output as much as possible, it might not be possible to reconstruct it exactly. Therefore, some flexibility may be built into the computer implemented method where it may deviate from the desired lighting output for a certain percentage. A user may set this percentage.

The term "lighting device" is used herein to refer to an implementation or arrangement of one or more light emitters in a particular form factor, assembly, or package. The term "light emitter" is used herein to refer to an apparatus including one or more light sources of same or different types. A given light emitter may have any one of a variety of mounting arrangements for the light source(s), enclosure/housing arrangements and shapes, and/or electrical and mechanical connection configurations. Additionally, a given light emitter optionally may be associated with (e.g., include, be coupled to and/or packaged together with) various other components (e.g., control circuitry) relating to the operation of the light source(s).

The term "light source" should be understood to refer to any one or more of a variety of radiation sources, including, but not limited to, LED-based sources (including one or more LEDs as defined below), fluorescent sources, phosphorescent sources, high-intensity discharge sources (e.g., sodium vapor, mercury vapor, and metal halide lamps), lasers, other types of electroluminescent sources, pyroluminescent sources, luminescent polymers, capable of emitting a light source unique signature such as, but not limited to, spectral and temporal signatures.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors. The computer program product may be distributed on such a storage medium, or may be offered for download through HTTP, FTP, e-mail or through a server connected to a network such as the Internet.

In various implementations, a processor may be associated with one or more storage media (generically referred to herein as "memory," e.g., volatile and non-volatile computer memory such as RAM, PROM, EPROM, and EEPROM, floppy disks, compact disks, optical disks, magnetic tape, USB sticks, SD cards and Solid State Drives etc.). In some implementations, the storage media may be encoded with one or more programs that, when executed on one or more processors, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The invention claimed is:

1. A computer implemented method for generating a virtual design of a unique user specific lighting device and for determining components for the virtually designed unique lighting device, the computer implemented method comprising the steps of:
   receiving, by a computer, desired lighting output information indicative of a desired light distribution and colors;
   selecting, using a computer database, an initial virtual lighting device comprising an initial set of lighting components to generate the desired light distribution and colors;
   adapting parameters of the initial virtual lighting device for generating the virtual design of the unique user specific lighting device while achieving the desired light distribution and colors; and
   determining, using the computer database, a modified set of lighting components for the virtually designed lighting device based on the virtual design of the unique user specific lighting device and on the desired lighting output information, wherein the step of determining the modified set of lighting components comprises:
   determining a number of lumens based on the desired light distribution and colors;
   determining a number of light emitters and types of the light emitters based on the number of lumens and based on the desired light distribution and colors; and determining a number of drivers and types of the drivers based on the number and types of the light emitters;

adapting a thickness and/or opacity of a wall of the virtually designed unique lighting device based on the desired light distribution and colors and the determined components of the virtually designed unique lighting device;

generating fabrication instructions for fabricating the unique user specific lighting device via 3D printing comprising:

generating fabrication instructions for fabricating a luminaire comprising the determined components of the unique user specific lighting device; and generating fabrication instructions for fabricating housing of the determined components of the unique user specific lighting device; and dispatching the fabrication instructions to a 3D printing machine for fabricating the unique user specific lighting device.

2. The computer implemented method of claim 1, wherein the step of receiving a desired lighting output information comprises:

receiving an application context and a physical context, wherein the application context at least comprises a purpose of the lighting output and wherein the physical context at least comprises dimensions of a region that is being illuminated by the lighting output.

3. The computer implemented method of claim 2, wherein the step of receiving a desired lighting output information further comprises:

visualizing an exemplary' lighting output based on the application context and physical context; and receiving feedback on the exemplary lighting output for determining the desired lighting output based on the exemplary lighting output and based on the feedback.

4. The computer implemented method of claim 3, further comprising: receiving light distribution information indicative of the light distribution of the desired lighting output, and visualizing an exemplary lighting output based on the application context, physical context and the light distribution information.

5. The computer implemented method of claim 3 wherein the physical context further comprises at least one of the following information types:

target area information indicative of a target area, wherein the target area information can comprise dimensions of the target area, the material of the target area and the color of the target area;

external light source information indicative of external light sources also illuminating the region that is being illuminated by the lighting output;

environmental information indicative of the environment of the target area, wherein the environmental information can comprise the color of the environment of the target area and the material of the environment of the target area; and color information indicative of the desired color of the lighting output.

6. The computer implemented method of claim 5, wherein the physical context further comprises pattern information indicative of a desired light pattern on the target area and wherein the computer implemented method further comprises:

generating a virtual lighting device able to generate the desired light pattern on the target area; and selecting the generated virtual lighting device as the initial virtual lighting device.

7. The computer implemented method of claim 3, wherein the application context further comprises at least one of the following information types:

user information indicative of the users of the lighting output, wherein the user information comprises at least one of the following information types:

age information indicative of an age of the users, eye quality information indicative of a quality of the eyes of the users, and demographic information indicative of a cultural background and or nationality of the users; and user context information indicative of at least one of the following information types: information on a user activity, information on a biorhythm of the user, and information on a state of mind of the user the lighting output is aimed to create.

8. The computer implemented method of claim 1, wherein the step of adapting parameters of the initial virtual lighting device for generating the virtual design of the unique lighting device while retaining the desired lighting output comprises adapting at least one of the following parameters:

a size of the unique lighting device, a shape of the unique lighting device, a material of the unique lighting device, a color of the unique lighting device, a type of light sources, a number of light sources, a grouping or addressability of the number of light sources, an orientation of light sources, a shape of the light sources, a size of the light sources, a color of light emitted by the light sources, an inner shape of the unique lighting device, a finish of the inner shape of the unique lighting device, a thickness of a wall of the unique lighting device, and an attachment mechanism of the unique lighting device.

9. The computer implemented method of claim 1, wherein the step of determining the components for the virtually designed unique lighting device based on the virtual design of the unique lighting device and on the desired lighting output, wherein the components at least comprise a non-light-emitting electronic hardware element for use in the virtually designed unique lighting device, further comprises:

receiving a desired number and a desired type of user interaction elements of the virtually designed unique lighting device; and determining a number of control components and a type of control components based on the desired number and type of user interaction elements and based on the desired lighting output.

10. The computer implemented method of claim 1, wherein the step of determining the components for the virtually designed unique lighting device based on the virtual design of the unique lighting device and on the desired lighting output, wherein the components at least comprise a non-light-emitting electronic hardware element for use in the virtually designed unique lighting device further comprises:

checking if the number and types of drivers, light emitters and/or control components can be built in the virtually designed unique lighting device;

adapting either the number and types of drivers, light emitters and/or control components or the design of the virtually designed unique lighting device based on the outcome of the checking step while retaining the desired lighting output.

11. The computer implemented method of claim 1, wherein the step of determining the components for the virtually designed unique lighting device based on the virtual design of the unique lighting device and on the desired lighting output, wherein the components at least comprise a non-light-emitting electronic hardware element for use in the virtually designed unique lighting device further comprises:
 determining the electronic components based on the number and types of drivers, light emitters and/or control components, wherein the electronic components comprise at least a power supply and cabling of the virtually designed unique lighting device.

12. The computer implemented method of claim 1, wherein computer implemented method further comprises:
 Determining optical elements for the virtually designed unique lighting device based on the desired lighting output and the determined components of the virtually designed unique lighting device.

13. The computer implemented method of claim 1, further comprising: visualizing, after at least one step, the virtually designed unique lighting device and or the exemplary lighting output;
 receiving feedback on the virtually designed unique lighting device and or on the exemplary lighting output, and
 taking into account the received feedback in the subsequent method steps.

14. A non-transitory computer readable medium comprising computer executable instructions for executing the method of claim 1.

15. A system comprising a user interface for interfacing with a user, and a processor configured to:
 receive, by a computer, desired lighting output information indicative of a desired light distribution and colors;
 select, using a computer database, an initial virtual lighting device comprising an initial set of lighting components to generate the desired light distribution and colors;
 adapt parameters of the initial virtual lighting device for generating the virtual design of the unique user specific lighting device while achieving the desired light distribution and colors; and
 determine, using the computer database, a modified set of lighting components for the virtually designed lighting device based on the virtual design of the unique user specific lighting device and on the desired lighting output information, wherein the step of determining the modified set of lighting components comprises:
 determine a number of lumens based on the desired light distribution and colors;
 determine a number of light emitters and types of the light emitters based on the number of lumens and based on the desired light distribution and colors; and
 determine a number of drivers and types of the drivers based on the number and types of the light emitters;
 adapt a thickness and/or opacity of a wall of the virtually designed unique lighting device based on the desired light distribution and colors and the determined components of the virtually designed unique lighting device;
 generating fabrication instructions for fabricating the unique user specific lighting device via 3D printing comprising:
 generating fabrication instructions for fabricating a luminaire comprising the determined components of the unique user specific lighting device; and
 generating fabrication instructions for fabricating housing of the determined components of the unique user specific lighting device; and
 dispatching the fabrication instructions to a 3D printing machine for fabricating the unique user specific lighting device.

\* \* \* \* \*